United States Patent
Butcher et al.

(10) Patent No.: US 9,507,581 B2
(45) Date of Patent: Nov. 29, 2016

(54) SYSTEMS AND METHODS OF DEVICE FIRMWARE DELIVERY FOR PRE-BOOT UPDATES

(71) Applicants: Wade Andrew Butcher, Cedar Park, TX (US); Terry Wayne Liles, Round Rock, TX (US); Raveendra Babu Madala, Bangalore (IN); Sumanth Vidyadhara, Bangalore (IN); Raghavendra Venkataramudu, Bangalore (IN)

(72) Inventors: Wade Andrew Butcher, Cedar Park, TX (US); Terry Wayne Liles, Round Rock, TX (US); Raveendra Babu Madala, Bangalore (IN); Sumanth Vidyadhara, Bangalore (IN); Raghavendra Venkataramudu, Bangalore (IN)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 14/596,627

(22) Filed: Jan. 14, 2015

(65) Prior Publication Data

US 2016/0202964 A1    Jul. 14, 2016

(51) Int. Cl.
*G06F 9/44* (2006.01)
*G06F 9/45* (2006.01)
*G06F 9/445* (2006.01)
*H04L 29/08* (2006.01)
*G06F 11/14* (2006.01)

(52) U.S. Cl.
CPC ................. *G06F 8/65* (2013.01); *G06F 8/665* (2013.01); *G06F 11/1417* (2013.01); *H04L 67/34* (2013.01)

(58) Field of Classification Search
CPC ............ G06F 8/61–8/68; G06F 8/665; G06F 11/1417; H04L 67/34
See application file for complete search history.

(56) References Cited

U.S. PATENT DOCUMENTS

| 7,213,152 B1 * | 5/2007 | Gafken ..................... G06F 8/65 |
| | | 713/187 |
| 7,765,371 B2 | 7/2010 | Abels et al. |
| 8,387,112 B1 * | 2/2013 | Ranjan .................... G06F 21/57 |
| | | 717/168 |
| 8,473,738 B2 * | 6/2013 | Osmolovsky ....... H03M 13/134 |
| | | 380/28 |
| 2004/0015953 A1 * | 1/2004 | Vincent ..................... G06F 8/65 |
| | | 717/173 |
| 2004/0236932 A1 * | 11/2004 | Zhang ...................... G06F 8/65 |
| | | 713/1 |

(Continued)

OTHER PUBLICATIONS

Vladimir Bashun, Too Young to be Secure: Analysis of UEFI Threats and Vulnerabilities, 2013, pp. 1-9.*

(Continued)

*Primary Examiner* — Thuy Dao
*Assistant Examiner* — Mongbao Nguyen
(74) *Attorney, Agent, or Firm* — Egan, Peterman, Enders & Huston LLP.

(57) ABSTRACT

Systems and methods are provided that may be implemented to deliver firmware for pre-boot updates of targeted information handling system device/devices using custom update capsules (e.g., such as custom unified extensible firmware interface capsules) and a separately-stored firmware update package that is remotely or locally stored. The custom update capsules may contain instruction payload information that may be used to determine location and desired components of the separately-stored firmware update package, and that also may be used to determine whether existing driver/drivers are to be retained in a firmware module in system memory or to be unloaded and replaced with a new (e.g., upgraded or downgraded) driver version in a firmware module in system memory as part of the firmware update.

26 Claims, 6 Drawing Sheets

(56) References Cited

U.S. PATENT DOCUMENTS

| | | | |
|---|---|---|---|
| 2007/0169079 A1* | 7/2007 | Keller | G06F 8/65 717/168 |
| 2007/0244987 A1* | 10/2007 | Pedersen | H04L 63/0272 709/217 |
| 2008/0195796 A1* | 8/2008 | Wang | H04L 67/34 711/102 |
| 2009/0037899 A1* | 2/2009 | Dharap | G06F 8/65 717/173 |
| 2009/0249120 A1* | 10/2009 | Yao | G06F 11/1417 714/15 |
| 2010/0268925 A1 | 10/2010 | Brisky et al. | |
| 2011/0035741 A1* | 2/2011 | Thiyagarajan | G06F 8/65 717/170 |
| 2011/0078293 A1 | 3/2011 | Phung et al. | |
| 2011/0289350 A1 | 11/2011 | Andrews et al. | |
| 2011/0296404 A1 | 12/2011 | Zhang et al. | |
| 2013/0031538 A1* | 1/2013 | Skalsky | G06F 8/665 717/168 |
| 2013/0125107 A1* | 5/2013 | Bandakka | G06F 8/665 717/171 |
| 2013/0205063 A1 | 8/2013 | Zhang et al. | |
| 2013/0311982 A1* | 11/2013 | Lal | G06F 8/65 717/172 |
| 2014/0115571 A1* | 4/2014 | Wang | G06F 8/665 717/168 |
| 2014/0130034 A1* | 5/2014 | Subbu | G06F 8/665 717/172 |
| 2014/0258700 A1* | 9/2014 | England | G06F 21/572 713/2 |
| 2014/0359592 A1* | 12/2014 | Phaedrus | G06F 8/65 717/168 |
| 2014/0372560 A1* | 12/2014 | Spottswood | H04L 67/34 709/217 |
| 2015/0242198 A1* | 8/2015 | Tobolski | G06F 8/61 717/172 |
| 2015/0248283 A1* | 9/2015 | Gschwind | G06F 9/4416 717/172 |
| 2015/0301821 A1* | 10/2015 | Danne | H04L 67/06 717/169 |

OTHER PUBLICATIONS

Kevin Butler, Firma: Disk-Based Foundations for Trusted Operating Systems, 2009, pp. 1-11.*
Richard Wilkins, UEFI Secure Boot in Modern Computer Security Solutions, 2013, pp. 1-10.*
Unified EFI, "Unified Extensible Firmware Interface Specification", Version 2.4, Errata B, Apr. 2014, Chapter 3, pp. 1827-1882, 58 pgs.

* cited by examiner

SYSTEMS AND METHODS OF DEVICE FIRMWARE DELIVERY FOR PRE-BOOT UPDATES

FIELD OF THE INVENTION

This invention relates generally to information handling systems and, more particularly, to firmware delivery for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many paradigms exist for designing firmware updates. Examples include platform "compatibility bits" used by updates. Another example is the practice of updating a device with monolithic binary images. These conventional firmware update practices do not always handle the network adapter (and other peripheral) product line complexities. Features are added and subtracted by suppliers over time and sometimes deployed across a product line with one firmware update package. However, the simplicity of this conventional practice for customers creates complexity for the implementers. This complexity is sometimes handled by operating system (OS)-based updates where vendor written logic corresponding to the update in progress can handle the changes and re-designs of the new package. However, this is not possible with pre-boot updates handled by device firmware loaded only from the existing firmware on a given device such as network adapter.

Figure 1:
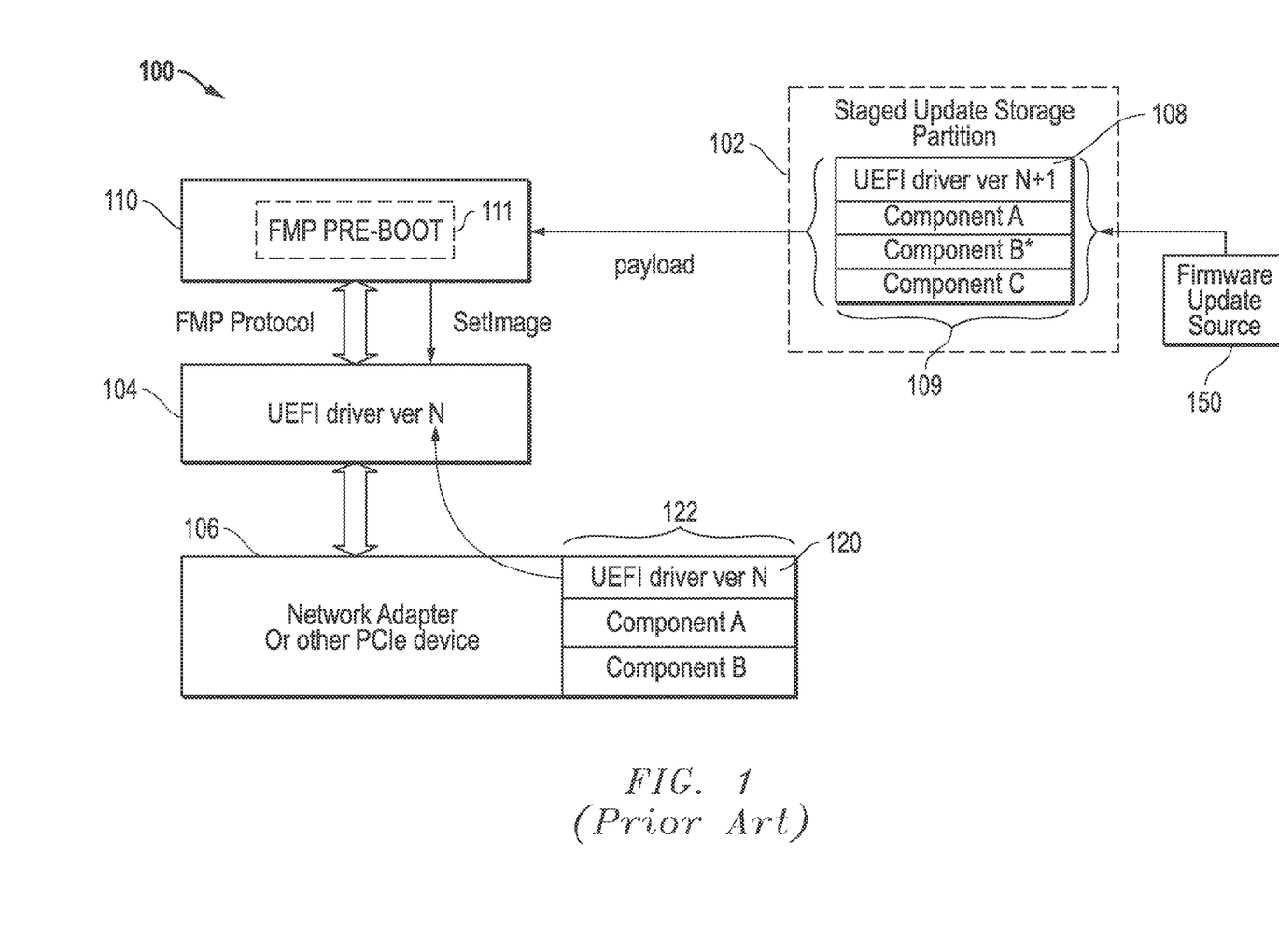
FIG. 1 illustrates a simplified block diagram of a conventional pre-boot firmware update methodology for an information system.

FIG. 1 illustrates an attempted conventional device pre-boot firmware update methodology for an information system 100 such as a server that includes a target PCIe device (in this case an Intel network adapter 106) that contains Version N of existing field-deployed unified extensible firmware interface ("UEFI") driver firmware 120 such as Option ROM stored in non-volatile memory for use during system boot. As shown in FIG. 1, existing firmware image 122 also includes existing components A and B. Over time, Version N UEFI driver firmware 120 cannot handle newer payloads for adapter device 106. Therefore, Version N of existing field-deployed driver firmware 120 must be unloaded and replaced by an updated newer Version N+1 of driver firmware 108. However, as described below payloads associated with new driver version N+1 firmware 108 cannot be applied to adapter device 106 while it is running existing Version N driver firmware 120 due to forward compatibility problems.

A similar problem can occur with firmware updates to other information handling system devices, e.g., such as RAID controller, BIOS, complex programmable logic devices (CPLDs), and other Firmware Management Protocol (FMP) based devices of an information handling system 100. Moreover, driver firmware downgrades may not be possible for similar reasons, e.g. such as when a newly loaded Version N+1 of driver firmware may be released with problems, necessitating a firmware downgrade to an older firmware version such as Version N−1 of driver firmware which includes one or more payload components that cannot be applied to a device while it is running the existing Version N+1 driver firmware. These problems can result in product defects and lack of out-of-band firmware update capability.

For example, in FIG. 1 a staged or step firmware update package including Version N+1 device driver 108 is being retrieved by a remote access controller (RAC) 102 into its internal non-volatile storage (staged update storage partition) from a firmware source 150 such as attached Flash storage device, network server, etc. In this regard, remote access controller 102 may be an integrated Dell Remote Access Controller (iDRAC) executing lifecycle management logic (e.g., Dell Life Cycle Controller available from Dell Products L.P. of Round Rock, Tex.). As shown in FIG. 1, the staged firmware update 109 includes Version N+1 UEFI driver 108 for adapter 106, as well as firmware payload component A (actual firmware image that is to be used as input to SetImage function in the application programming interface that is defined by the UEFI standard in the firmware management protocol), new version firmware payload component B* (UEFI driver that is needed for the success of SetImage method to apply firmware image of component A), and new firmware payload component C, all for the same device adapter 106. As shown by the upward arrow in FIG. 1, the SetImage method uses the driver that is available. In this case version N 120 is present hence it is used, e.g. loaded into a UEFI Firmware module in system memory 104.

As further shown in FIG. 1, firmware update 109 including new Version N+1 UEFI driver firmware 108 is provided as a payload via RAC 102 to existing pre-boot software in the form of FMP-based pre-boot software (e.g., Dell Life Cycle Controller available from Dell Products L.P. of Round Rock, Tex.) 111 executing on host CPU 110 that operates to utilize FMP to update firmware for particular target devices on information handling system 100, e.g., in a manner consistent with Chapter 32 of UEFI Specification 2.4. FMP-based logic in turn attempts to provide the new firmware payload components of firmware update 109 to system random access memory (RAM) 104 via Firmware Management Protocol for loading to non-volatile memory of adapter 106. However, in the illustrated case, existing Version N of UEFI driver firmware 120 can only update Firmware images A and B*, while newer Version N+1 of UEFI Driver firmware 108 is required to update all Firmware images A, B* and C. Thus, new Version N+1 UEFI driver firmware 108 and the new payload components cannot be loaded into system memory 104 for use by adapter 106 for one or more possible reasons, e.g., new firmware payload component C is unrecognized by the existing version of FMP pre-boot software 111, etc. Since the payload components A, B* and C associated with new Version N+1 of driver firmware 108 cannot be applied to adapter 106 while it is running the existing Version N of UEFI driver firmware 120, then existing Version N of UEFI driver firmware 120 must be first unloaded prior to loading the newer Version N+1 of UEFI Driver firmware 108 to handle update A, B* and C firmware images.

Figure 2:
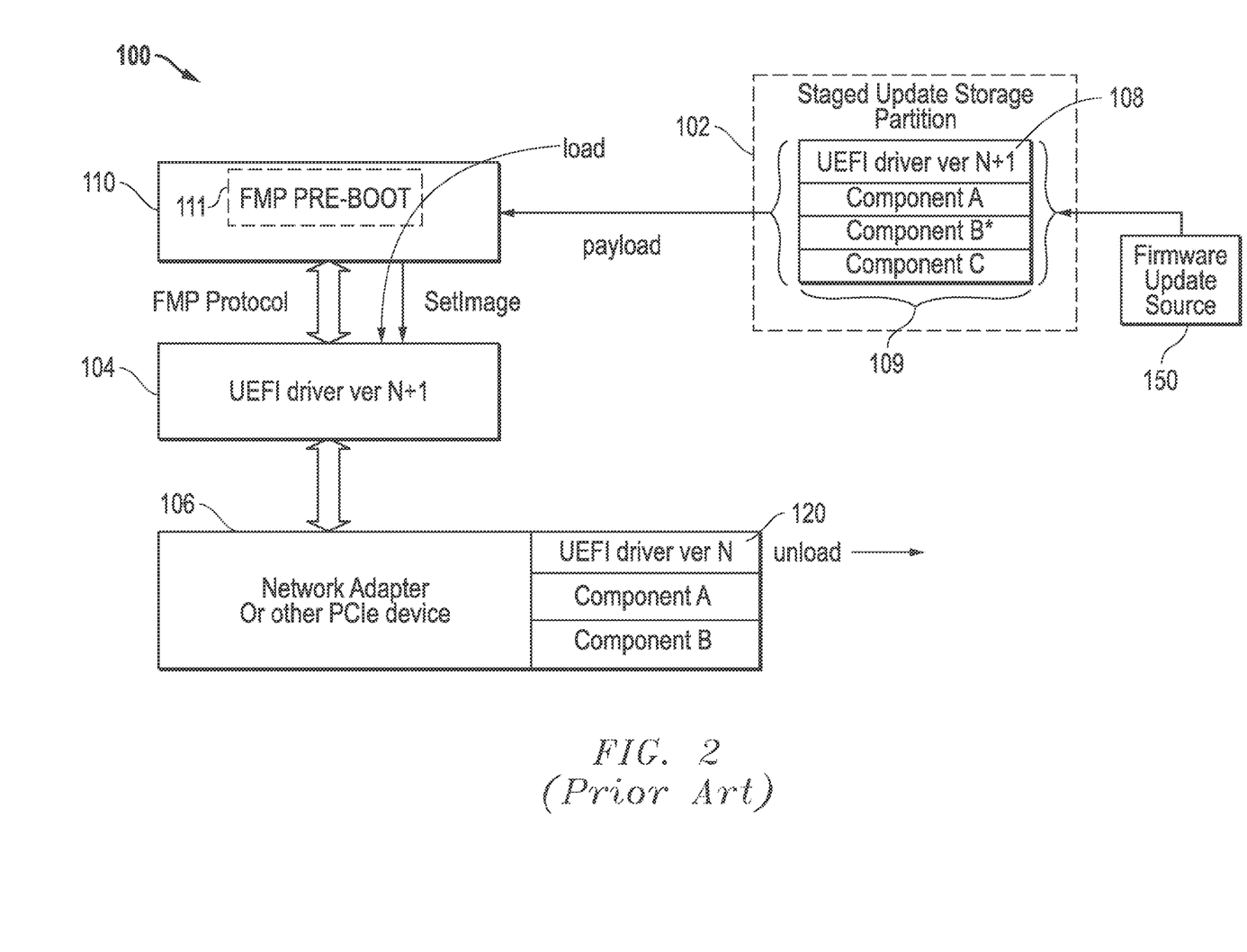
FIG. 2 illustrates a simplified block diagram of a conventional pre-boot firmware update methodology for an information system.
Figure 3:
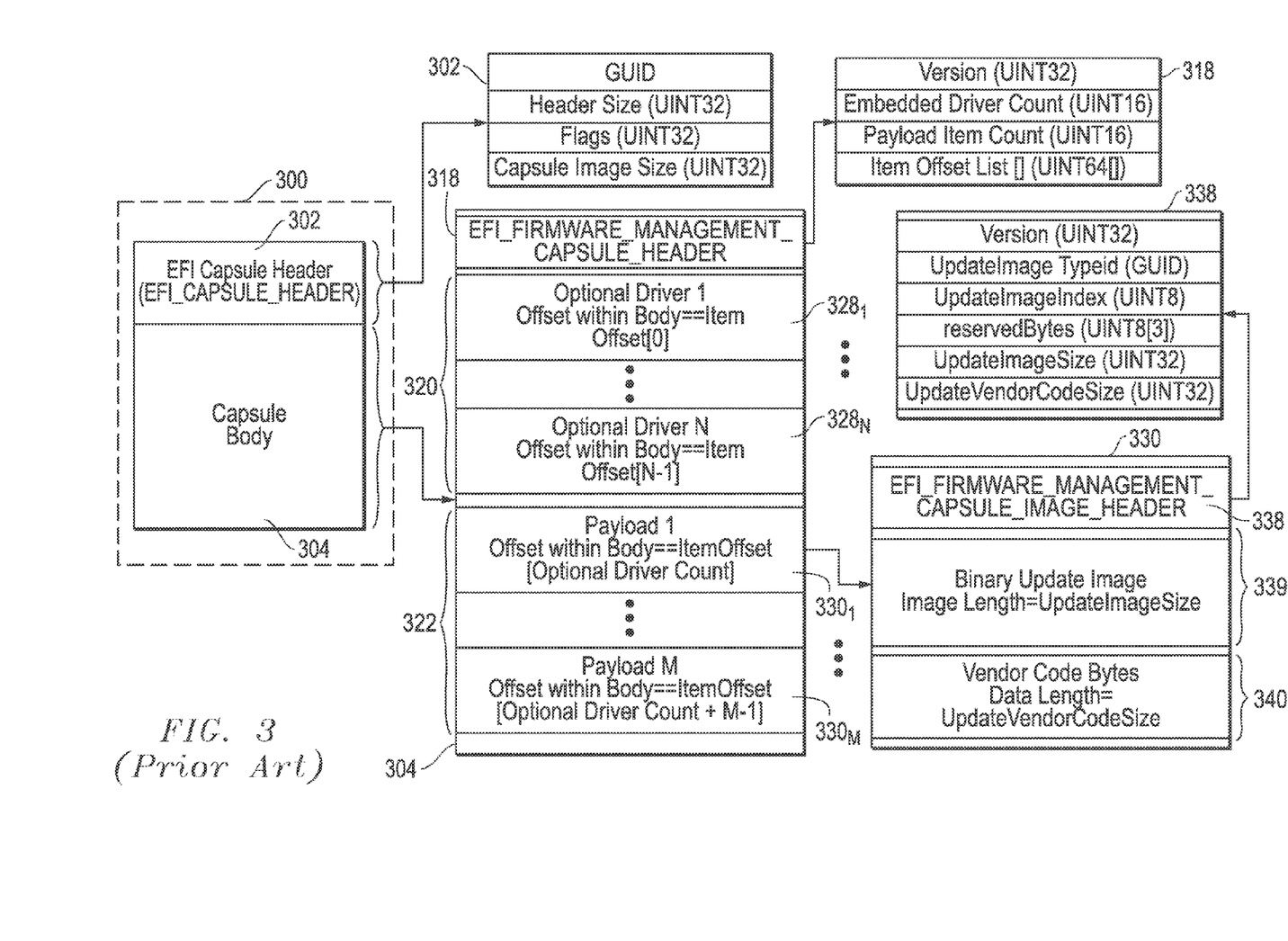
FIG. 3 illustrates a convention UEFI capsule.

FIG. 2 illustrates another conventional device firmware update methodology for an information system 100 that is provided by Chapter 32.2 of UEFI Specification 2.4. In this methodology, a UEFI capsule 300 as shown in FIG. 3 is provided with a capsule format that includes an EFI capsule header 302 and capsule body 304 that includes an EFI firmware management capsule header 318, an optional driver section 320 and a payload section 322. As shown, optional driver section 320 includes new driver firmware versions (e.g., such as new Version N+1 UEFI driver firmware 108) in the form of one or more optional drivers 328, together with one or more firmware payload components 330. Particular sections of EFI capsule header 302 include capsule identifier and size. Particular sections of EFI firmware management capsule header 318 include the number of payloads, drivers included along with the offsets at which they are available. Particular sections of each given optional firmware payload component 330 includes an EFI firmware management capsule image header 338, a binary update image section 339 and a vendor code bytes section 340, with the capsule image header 338 including an update image identifier that enables one to identify the appropriate driver required to apply the image as shown.

Using the methodology of FIG. 2, FMP pre-boot software 111 is supposed to locate and identify a new version of UEFI driver firmware (e.g., new Version of N+1 UEFI driver firmware 108) within UEFI capsule 300 as an optional component, and to then load it into non-volatile memory of adapter 106 or other target device via system memory 104 as shown if the new version 108 of driver firmware is found to be newer than the exiting version (e.g., existing Version N of UEFI driver firmware 120). In such a case, the existing version of driver firmware 120 is first unloaded as shown. However, existing deployments of FMP pre-boot software 111 are not capable of interpreting the new UEFI capsule format that includes the optional firmware driver 108 and payload sections 320 and 322. Further, no standardized logic to determine how and when to unload resident firmware drivers to be replaced have been detailed to date. In this regard, the sequence of Update to be applied is not specified. Additionally, using conventional methodology, drivers need to follow UEFI Driver Binding Protocol in the UEFI Capsule 300 (Get Driver Version) and only higher versions of driver firmware are loaded.

SUMMARY

Disclosed herein are systems and methods that may be implemented to deliver firmware for pre-boot updates of targeted information handling system device/s using custom update capsules and a separately-stored firmware update package that is remotely or locally stored. The custom update capsules may contain instruction payload information that may be used in one embodiment to determine location and desired components of the separately-stored firmware update package, and that also may be used to determine whether existing driver/s are to be retained in a UEFI Firmware module in system memory or to be unloaded and replaced with a new (e.g., upgraded or downgraded) driver version in a UEFI Firmware module in system memory as part of the firmware update. In one embodiment, the custom update capsules may be custom UEFI capsules that are created by modifying a conventional UEFI capsule format (i.e., that is compliant with UEFI 2.4 specification or other UEFI specification version) by stripping out or removing firmware update payload images from a conventional UEFI capsule and replacing the update payload images with instruction payload information as metadata in the custom UEFI capsule. The stripped or removed update payload images may be stored in a separate location from the UEFI capsule (e.g., optionally external to the information handling system) and information detailing this update storage location may be encapsulated within the instruction payload information of the metadata together with the driver metadata which may be a part of the UEFI Custom capsule.

In one embodiment, a combination of the above-described custom UEFI-based capsule format together with a minimized update package storage footprint (e.g., meaning minimized use of remote access controller Flash space) that is provided by virtue of separate (e.g., external) update payload image storage may be advantageously implemented (e.g., by pre-boot software) to provide a variety of features including, but not limited to, BareMetal OS and firmware deployment with minimal footprint on system non-volatile memory (e.g., Flash) space for information handling systems such as servers, the ability to dynamically handle a variety of different types and/or combinations of firmware update actions (e.g., existing driver unload as well as new driver load actions), ability to provide driver update packages via a custom UEFI capsule that supports updates for both legacy (i.e., non-UEFI compatible) systems and UEFI-compatible systems, etc.

In one exemplary embodiment, a custom UEFI capsule may be provided with a firmware update that is applicable to all systems (i.e., both non-UEFI 2.4 compatible systems and UEFI 2.4 compatible systems) that include a specific target device, such as a network adapter, etc. Non-UEFI 2.4 compatible systems (such as UEFI 2.3 compatible systems) do not have the capability of consuming UEFI 2.4 capsules or custom capsules of the disclosed systems and methods. The non-UEFI 2.4 compatible systems not having that capability cannot interpret the UEFI 2.4 or custom capsules, and consequently might assume that only firmware image is supplied and would be expecting it at a specific location inside the update package for applying. Using the disclosed systems and methods, stripping and separate storage of firmware update payload images (as described herein) may be employed to enable the non-UEFI 2.4 compatible systems to find the separately stored payload firmware update package, e.g., by using xml schemas defined to allow non-UEFI 2.4 compatible lifecycle management logic (e.g., executing as FMP-based pre-boot software on a system Host processor) to locate the separately stored firmware update payload images for updates.

In one exemplary embodiment the disclosed systems and methods may employ a custom update capsule having an inserted instruction metadata payload that includes locator information (e.g., in locator table format) that describes where particular removed firmware update payload/s (i.e., binary image/s) have been stored elsewhere (e.g., such as on network storage or other type of external storage, or on local storage such as Embedded Flash Storage, USB, Harddisk, etc.), as well as identifier information (e.g., in identifier table format) that describes or otherwise indicates (e.g., by metadata operator/s) what version/s of driver is capable of programming the removed firmware update payload/s into non-volatile memory of a given target device of the information handling system. Using the disclosed systems and methods, custom update capsules may be implemented to enable out-of-band firmware update capability, i.e., in a manner that is not possible with conventional UEFI capsule formats.

In one embodiment, an instruction metadata payload may be configured within a custom UEFI capsule to be locatable by pre-boot software (e.g., executed by a host processor or other processing device of the information handling system) by virtue of placement of the instruction payload metadata in an expected capsule location that is consistent with pre-existing UEFI capsule update package format. Such identifier information (e.g., identifier table) may be created in one embodiment to handle all possible upgrade and download cases or scenarios in order to allow the pre-existing pre-boot software to decide whether to retain, reload or replace the resident drivers during the update operation. For example, such identifier information may be advantageously employed to enable successful pre-boot update in cases where the source unmodified conventional UEFI capsule of a pre-boot update calls for the "latest" (and non-loaded) driver/drivers to be installed or used even in the case of a firmware downgrade where the latest driver in the conventional UEFI capsule may not be appropriate or functional for the downgrade.

The disclosed systems and methods may be advantageously implemented to support a variety of different types of update packages having different types and/or combinations of required update actions including, for example, firmware version downgrades and updates that require first unloading of an existing field-deployed resident driver version from a UEFI module in system memory prior to loading a different driver version into the UEFI module in system memory. Thus, the disclosed systems and methods may be implemented in one embodiment to enable pre-boot software to determine what update actions are required based on the locator information and the identifier information of the instruction metadata payload of a custom update capsule. For example, in one embodiment pre-boot software executing on a processing device may implement an update operation by first querying a target device to determine the version of a driver currently loaded on the system memory (e.g., in UEFI Firmware module), and then determining the next action to take based on the instruction payload information (e.g., instruction metadata payload) given the determined version of the currently resident driver version. For example, in a case where a different driver version is to be loaded into system memory from a custom capsule, the pre-boot software may read a driver metadata operator/operators inserted in the custom capsule to understand the next steps or actions to perform, e.g., such as existing driver version on resident firmware of target device is to be unloaded from system memory and replaced by a newer or otherwise different driver version loaded from the custom capsule, no change is to be made to the resident driver version which is to be left on system memory, etc.

In a further embodiment, firmware update payload/s may be optionally stored on a network share or other external source rather than stored in embedded storage (e.g., such as remote access controller storage) and/or rather than in other internal storage or memory of an information handling system that is subject of a pre-boot update. Using this implementation, an entire firmware image payload may be stored in a remote location (e.g., separate and external to the information handling system chassis and separate from the custom capsule) for rollback, backup and/or update of the firmware images (e.g., optionally together with operating system (OS) driver pack). In such an embodiment, instruction metadata payload (e.g., that includes locator information such as locator table) contained in the custom capsule may be used by the pre-boot software to find and retrieve the firmware update payload images from the external source so that the pre-boot software can apply the firmware updates on one or more device/s of the information handling system. In such an embodiment, firmware update payload/payloads may be stored externally or remotely rather than on an embedded device or other internal device within the information handling system. This means that the size of internal memory (e.g., embedded flash memory) does not need to grow with each new firmware device being added to the system as is the case with conventional firmware update technology.

In a further embodiment, remote or external storage of firmware update payloads may be implemented to avoid the need to create and deliver identical firmware payloads in different formats which would use an unreasonable amount of the limited embedded storage space used for out-of-band updates, while at the same time enabling unloading and replacement of resident drivers when needed to accomplish a given firmware update task in a manner that is not possible with conventional UEFI capsules because no logic is detailed in the existing UEFI specification for determining how and when to unload resident drivers to be replaced. Thus, using the disclosed systems and methods, different update options (e.g., such as Downgrade the Driver, Do not Update the Driver, Upgrade the Driver) may be selected based on the characteristics of a particular update task and requirements for a particular driver version, i.e., in a manner that is possible using conventional UEFI capsules.

In one respect, disclosed herein is a method of delivering firmware for pre-boot updates to an information handling system, including using at least one processing device of the information handling system to perform the following steps in an out-of-band manner prior to booting the information handling system: retrieving a custom update capsule from a source external to the information handling system; reading instruction payload information contained in the custom update capsule to determine a specified location of a given firmware update package that is remotely or locally stored, the given firmware update package being separate from the custom update capsule and including one or more firmware images; and retrieving the given firmware update package from the specified location determined from the the specified firmware update package.

In another respect, disclosed herein is a method of determining a firmware driver update action during pre-boot operation of an information handling system, including using at least one processing device of the information handling system to perform the following steps in an out-of-band manner prior to booting the information handling system: retrieving a custom update capsule from a source external to the information handling system, the custom update capsule including instruction payload information and multiple driver version images contained therein; and reading the instruction payload information contained in the custom update capsule to determine a driver update action; and then performing the determined driver update action. In one embodiment, the determined driver update action may be either one of: unloading an existing firmware driver version from a system memory of the information handling system and loading a different upgraded or downgraded firmware driver version on to the system memory from the custom update capsule, or leaving the existing firmware driver version resident on the system memory and not loading a different firmware driver version on system memory from the custom update capsule.

In another respect, disclosed herein is an information handling system, including at least one processing device configured to perform the following steps in an out-of-band manner prior to booting the information handling system: retrieving a custom update capsule from a source external to the information handling system; reading instruction payload information contained in the custom update capsule to determine a specified location of a given firmware update package that is remotely or locally stored, the given firmware update package being separate from the custom update capsule and including one or more firmware images; and retrieving the given firmware update package from the specified location determined from the the specified firmware update package.

In another respect, disclosed herein is an information handling system, including at least one processing device configured to perform the following steps in an out-of-band manner prior to booting the information handling system: retrieving a custom update capsule from a source external to the information handling system, the custom update capsule including instruction payload information and multiple driver version images contained therein; reading the instruction payload information contained in the custom update capsule to determine a driver update action; and then performing the determined driver update action. In one embodiment, the determined driver update action being either one of: unloading an existing firmware driver version from a system memory of the information handling system and loading a different upgraded or downgraded firmware driver version on to the system memory from the custom update capsule, or leaving the existing firmware driver version resident on the system memory and not loading a different firmware driver version on to the system memory from the custom update capsule.

DESCRIPTION OF ILLUSTRATIVE EMBODIMENTS

Figure 4:
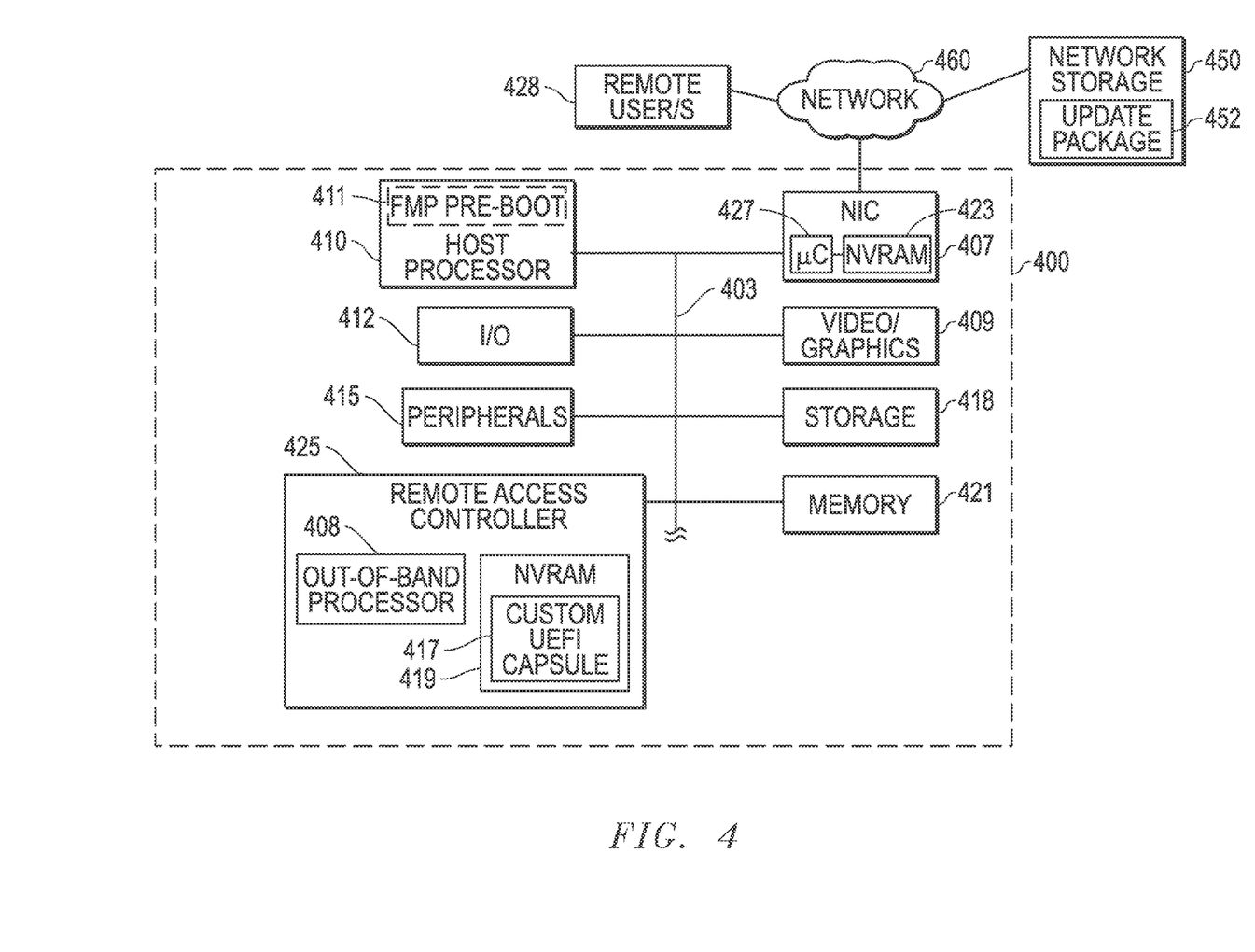
FIG. 4 illustrates a simplified block diagram of an information handling system configured according to one exemplary embodiment of the disclosed systems and methods.

FIG. 4 illustrates an information handling system 400 (e.g., server, desktop PC, etc.) configured according to one exemplary embodiment of the disclosed systems and methods. As shown, information handling system 400 includes a remote access controller 425 that includes at least one out-of-band processor 408 and associated embedded memory 419 having a custom UEFI capsule 417 stored thereon, e.g., that has been retrieved from external network storage 450 across network 460 (e.g., Internet, corporate intranet, etc.) via network interface card (NIC)/network adapter 407 or from any other suitable external or local source. As further shown, network storage 450 includes a firmware update package 452 that has been stripped or removed from a conventional UEFI specification capsule and stored on the external network storage 450. In the illustrated embodiment, custom UEFI capsule 417 may include one or more versions of operational drivers for updating firmware of one or more FMP-based target devices on information handling system 400, such as network adapter 407 and/or other type of target device of an information handling system such as RAID controller, BIOS, complex programmable logic devices (CPLDs), etc. Such target devices may have an embedded processing device (e.g., such as microcontroller 427 of adapter 407) that is configured to load a resident driver into system memory 421 and execute other firmware components from target device embedded memory (e.g., non-volatile memory 423 of adapter 407).

Still referring to FIG. 4, system 400 may also include one or more host processing devices 410, one or more buses or communication media 403, video/graphics hardware 409, storage (e.g., hard disks) 418, system memory (e.g., RAM) 421, local input/output (I/O) 412, and peripherals 415. Bus 403 provides a mechanism for the various components of system 400 to communicate and couple with one another. Host processing device/devices 410 may include a Host processor (e.g., CPU) configured to run a host operating system (OS) during in-band operation, and/or configured to run FMP-based pre-boot software (e.g., Dell Life Cycle Controller available from Dell Products L.P. of Round Rock, Tex.) 411 during out-of-band operation as needed, and out-of-band processor 408 may be a service processor, embedded processor, etc. Video/graphics 409, storage 418, memory 421, I/O 412 and peripherals 415 may have the structure, and perform the functions known to those of skill in the art. Besides memory 421, processing device 410 may include cache memory for storage of frequently accessed data, and storage 418 may include extended memory for processing device 410. One or more remote users 428 may also optionally communicate and interact with information handling system 400 via network 460 as shown.

It will be understood that the embodiment of FIG. 4 is exemplary only, and that an information handling system may be provided with one or more processing devices that may perform the functions of processing device 410, processing device 408, remote access controller 425, and other optional processing devices. Examples of such processing devices include, but are not limited to, central processing units (CPUs), embedded controllers, microcontrollers, application specific integrated circuits (ASICs), field programmable gate arrays (FPGAs), etc.

Figure 5:
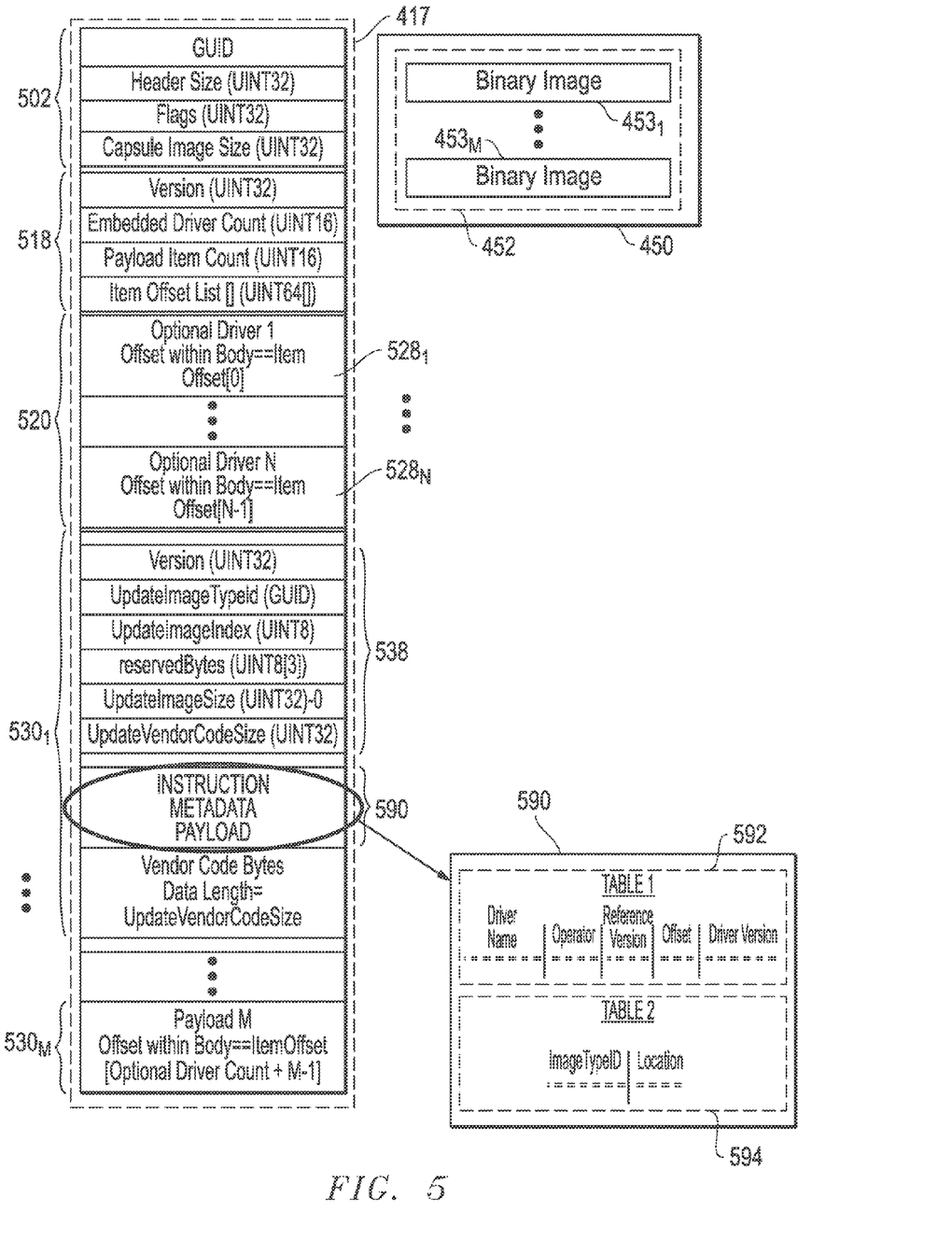
FIG. 5 illustrates a custom UEFI capsule and removed capsule components according to one exemplary embodiment of the disclosed systems and methods.

FIG. 5 illustrates a relationship between components of a custom UEFI capsule 417 having a EFI capsule header 502 and removed firmware update package 452 that has been stored on external network storage 450 of FIG. 4, although a firmware update package 452 may be alternatively stored on local storage (e.g., such as RAC embedded flash memory 417) of system 400 in another embodiment. As shown, firmware update package 452 may include a binary image update section (e.g., including multiple separate binary images $453_1$ to $453_M$) that has been stripped from each of the corresponding payload components $530_1$ to $530_M$ of capsule 417 and stored on network storage 450 or other suitable storage location external to information handling system 400 of FIG. 4. In one embodiment, driver section 520 may include the optional drivers 528 described in relation to FIGS. 1 and 2 that include Version N+1 UEFI driver associated with firmware payload component A, new version firmware payload component B* and new firmware payload component C.

As further shown in FIG. 5, metadata in the form of an instruction metadata payload 590 has been inserted into custom UEFI capsule 417 in place of removed firmware binary images (e.g., binary image including firmware payload component A, new version firmware payload component B*, new firmware payload component C, etc.) of firmware update package 452. In the illustrated exemplary embodiment, instruction metadata payload 590 includes identifier information 592 in the form of an identifier table (Table 1) that includes information that includes the name or identifier of the optional driver (e.g., Version N+1 UEFI driver) associated with a given binary image 453 (e.g., binary image including firmware payload component A, new version firmware payload component B*, and new firmware payload component C). Instruction metadata payload 590 may also include a reference driver version ID to which a corresponding metadata operator (described below) of Table 1 refers, offset of the location of the corresponding optional driver in capsule 417, and the capsule version that identifies version of the Capsule Structure.

Still referring to FIG. 5, the identifier table or identifier information 592 may in one embodiment also include a metadata operator for each individual optional driver 528 that serves the purpose of indicating what version/s of existing resident device drivers are needed for programming each of the individual binary images 453 of firmware update package 452 into non-volatile memory of a given target device (e.g., non-volatile memory 423 of network adapter 407) of information handling system 400. Examples of such metadata operators include, but are not limited to, greater than (">"), less than ("<"), equal to ("="), greater than or equal to ("≥"), less than or equal to ("≤"), etc. In the illustrated exemplary embodiment, the respective metadata operator for a given optional driver version may be read from identifier table (Table 1) by FMP-based pre-boot software 411 executing on processing device 410 and then compared to the corresponding reference driver version of the same line entry of identifier table (Table 1) to determine if the current field-deployed resident driver in non-volatile memory of a given target device and loaded into system memory 421 is capable of reading and applying the corresponding binary image 453 of the firmware update to the given target device.

As an example, in one embodiment, host processing device 110 may execute FMP-based pre-boot software 411 to check the identity of the existing version of the target device driver (Example Intel NIC FMP Driver). If the Instruction Metadata Payload 590 in the Custom capsule 417 has an operator ">", the FMP-based pre-boot software 411 may be executed to check if the UEFI Driver version in the UEFI Custom capsule 417 is greater than the existing target device driver in the system and, only if so, then load the new Intel UEFI FMP NIC Driver into system memory 421 from Custom Capsule contents.

As further shown in FIG. 5, instruction metadata payload 590 may also include locator information 594 in the form of a locator table (Table 2) that includes payload binary image identifier information (ImageTypeID identifies the Firmware image to be updated) for a given binary image 453 (e.g., firmware payload component A, new version firmware payload component B*, new firmware payload component C), together with its corresponding local or remote storage location (e.g., network storage path name, local storage path name, directory tree, etc.), e.g., stored in update package 452 on external network storage 450 in this example. Additionally, EFI firmware management capsule image header 538 may be modified as shown to indicate the modified format with indicative Globally Unique Identifier (GUID) (e.g., UpdateImageTypeID) and new corrected custom image size (e.g., UpdateImageSize) for the metadata content of the instruction metadata payload 590. Although UEFI-based custom capsules are illustrated and described herein for purposes of example, it will be understood that the disclosed systems and methods are not limited to UEFI-based custom capsules, but rather may be implemented in combination with separately stored firmware update package/s using any alternative update capsule format having driver and instruction metadata payload information contained therein.

Figure 6:
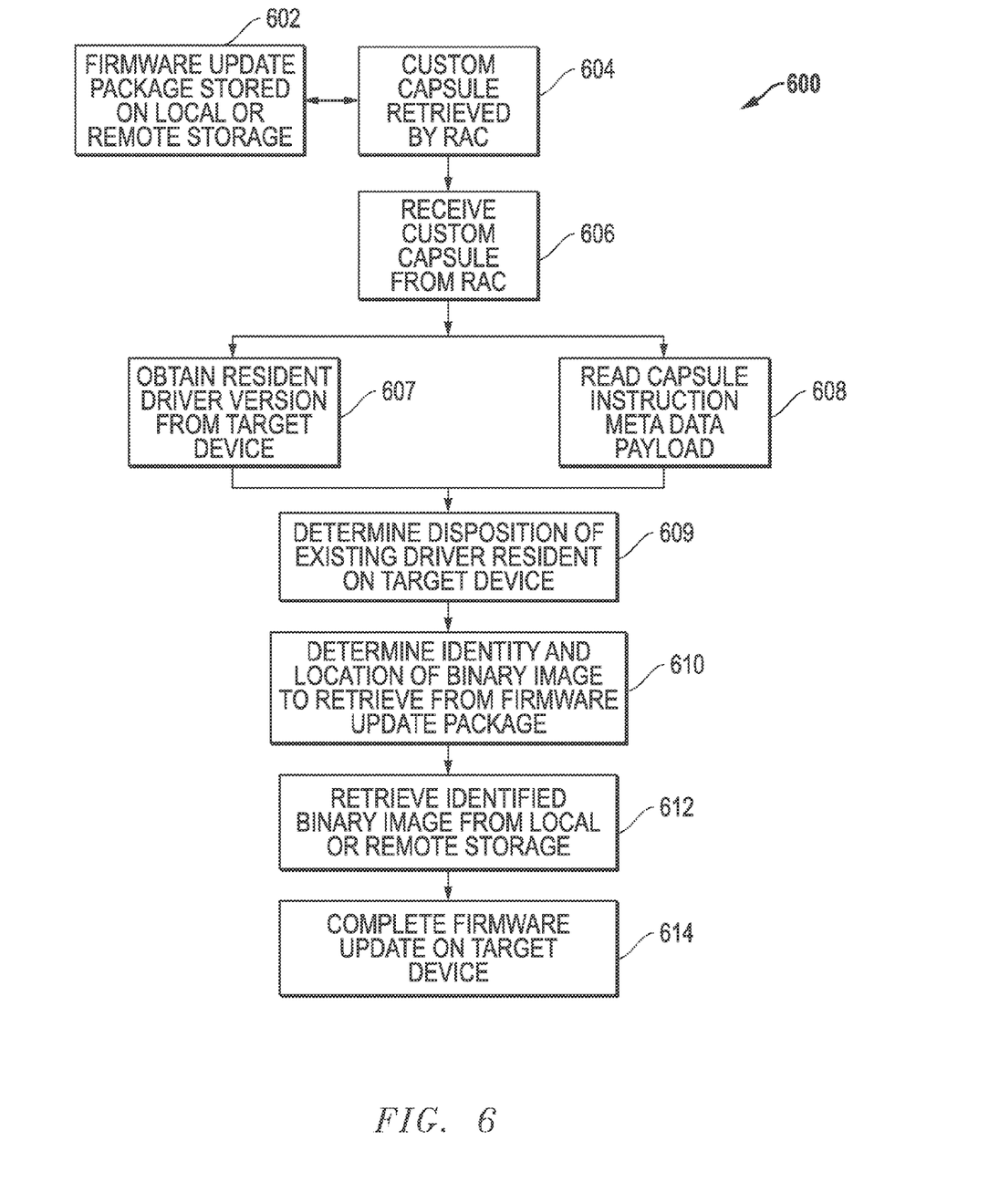
FIG. 6 illustrates a methodology to deliver firmware for pre-boot updates according to one exemplary embodiment of the disclosed systems and methods.

FIG. 6 illustrates one exemplary embodiment of methodology 600 that may be implemented to deliver firmware for pre-boot updates of a target information handling system device (e.g., such as such as RAID controller, BIOS, complex programmable logic devices (CPLDs) and other FMP based devices of an information handling system 400 of FIG. 4) using custom UEFI capsules 417. In one embodiment, methodology 600 may be implemented to deliver firmware for such pre-boot updates to an information handling system. It will be understood that methodology 600 is described with reference to system 400 of FIG. 4 for illustration purposes only, and that methodology 600 may be implemented to deliver firmware for pre-boot updates of a target device of other configurations of information handling systems. Moreover, it will be understood that the methodology of FIG. 6 is exemplary only, and that in other embodiments other combinations of additional, fewer, alternative or different-ordered steps may be employed to deliver firmware for pre-boot updates of a target information handling system device.

Returning to FIG. 6, methodology 600 starts in step 602 and 604 with firmware update package 452 stored on external network storage 450 (e.g., by a firmware vendor), and with retrieval of custom UEFI capsule 417 by the remote access controller (RAC) 425 or other out-of-band processing device of information handling system from an external source, e.g., such as from across network 460 from a firmware update vendor. In step 604, RAC 425 may store retrieved custom UEFI capsule 417 on RAC embedded storage 417 as shown in FIG. 4.

Next, in step 606 host processing device 410 may execute FMP-based pre-boot software 411 in an out-of-band manner (i.e., separate from and outside a host OS of system 400 prior to system and OS booting) to retrieve contents of custom UEFI capsule 417 from RAC embedded memory 419. Host processing device 410 may also use the FMP-based logic in step 607 to obtain the identity of resident driver version currently loaded on the target device, as well as to read instruction metadata payload information 590 of the retrieved custom UEFI capsule contents in step 608, e.g., including identifier information 592 (e.g., identifier Table 1 of FIG. 5) and locator information 594 (e.g., locator Table 2 of FIG. 5). It will be understood that step 607 may be performed earlier by FMP-based logic, e.g., before steps 604 and 606. It will be understood that retrieval of a custom UEFI capsule 417 via RAC 425 is optional and that FMP-based logic executing on host processing device 410 may receive custom capsule 417 and/or any other firmware update payload components from any suitable source other than a RAC.

Host processing device 410 may then execute FMP-based pre-boot software 411 in step 609 to analyze the identifier information 592 of capsule 417 in view of the identity of the existing driver version on the target device to determine the disposition of the resident (e.g., field-deployed) driver version existing on the target device by determining whether the resident driver version should be kept in system memory 421 or replaced in system memory 421 with a new (e.g., upgrade or downgrade) driver version 518 from custom UEFI capsule 417, e.g., using metadata operators as described in relation of FIG. 5. Also in step 609, FMP-based logic may proceed accordingly by keeping or replacing the resident driver with a new optional driver 528 as determined by analyzing the identifier information 592.

Host processing device 410 may execute FMP-based pre-boot software 411 in step 610 to analyze the locator information 494 to determine the identity and location of the particular binary firmware image 453 to retrieve from the firmware update package 452 in a manner described in relation to FIG. 5. Next, as shown in FIG. 6, host processing device 410 may then execute FMP-based pre-boot software 411 in step 612 to retrieve the identified binary firmware image 453 from the firmware update package 452. In step 614, the resident driver (whether replaced or not replaced in step 609) may be executed by a processing device (e.g., microcontroller) of the target device to retrieve the identified binary firmware image 453 from the firmware update package 452, and to complete firmware update on the target device of system 400 by loading the firmware update into non-volatile memory of the target device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will be understood that one or more of the tasks, functions, or methodologies described herein (e.g., including those performed by host processing device 410 and remote access controller 425) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of delivering firmware for pre-boot updates to an information handling system, comprising using at least one processing device of the information handling system to perform the following steps in an out-of-band manner separate from and outside an operating system prior to operating system booting and prior to booting the information handling system:

retrieving a custom unified extensible firmware interface ("UEFI") update capsule from a source external to the information handling system, the UEFI custom update capsule being formed from an original UEFI capsule by removing one or more firmware images from the original UEFI capsule and replacing the removed firmware images with instruction payload information that describes a specified remote or local storage location for a given firmware update package that includes the removed firmware images, the specified remote or local storage location being separate from the UEFI custom update capsule;

reading the instruction payload information contained in the custom update capsule to determine the specified location of the given firmware update package that is remotely or locally stored, the given firmware update package being separate from the custom update capsule and including the one or more firmware images; and retrieving the given firmware update package from the specified location determined from the specified firmware update package;

where the custom update capsule contains none of the firmware images contained in the firmware update package; and where the custom update capsule has a format of a conventional UEFI capsule with the instruction payload information substituted in place of firmware payload components that include the firmware images of the firmware update package that are stored separately from the custom update capsule.

2. The method of claim 1, where the specified location is remote and external to the information handling system.

3. The method of claim 2, where the specified location is network storage coupled to the information handling system by a network; and where the method further comprises retrieving the given firmware update package across the network from the network storage.

4. The method of claim 1, where the source external to the information handling system is separate and external to a chassis of the information handling system; and where the method further comprises using a remote access controller processing device within the information handling system to retrieve the custom update capsule across an external network from the source external to the information handling system, and to store the retrieved custom update capsule in non-volatile memory within the information handling system that is coupled to the remote access controller; providing the custom update capsule from the remote access controller to a host processing device within the information handling system across an internal communication bus of the information handling system; and using the host processing device to read the instruction payload information contained in the custom update capsule to determine the specified location of a given firmware update package, and retrieve the given firmware update package from the determined specified location.

5. The method of claim 4, where the information handling system is a server or desktop computer.

6. The method of claim 1, where the given firmware update package is configured for a target device of the information handling system that is currently connected to the at least one processing device of the information handling system; and where the method further comprises using a processing device of the information handling system to execute a current firmware driver of the target device to load one or more of the firmware images of the firmware update package into non-volatile memory of the target device.

7. The method of claim 1, further comprising performing the following steps before the step of retrieving the custom UEFI update capsule from the source external to the information handling system:
removing the one or more firmware images from the original UEFI capsule and storing the removed firmware images as part of the given firmware update package in the specified remote or local storage location; and
replacing the removed firmware images with the instruction payload information that describes the specified remote or local storage location of the given firmware update package that includes the removed firmware images to form the UEFI custom update package.

8. The method of claim 1, where the given firmware update package comprises a binary image update section that includes multiple separate binary images that have been removed from the original UEFI capsule, and a driver section containing additional optional drivers associated with each separate binary image; where the instruction payload information includes an identifier table that contains a name and identifier of each optional driver associated with each binary image, and a locator table that includes payload binary image identifier information that identifies each firmware image to be updated together with its corresponding local or remote storage location; and where the method further comprises using a host processing device within the information handling system to execute Firmware Management Protocol (FMP)-based pre-boot software to read the driver version from the identifier table to determine if the current field-deployed resident driver in non-volatile memory of a given target device is capable of reading and applying a corresponding binary image of the firmware update package to the given target device.

9. A method of determining a firmware driver update action during pre-boot operation of an information handling system, comprising using at least one processing device of the information handling system to perform the following steps in an out-of-band manner separate from and outside an operating system prior to operating system booting and prior to booting the information handling system:
retrieving a custom unified extensible firmware interface ("UEFI") update capsule from a source external to the information handling system, the custom update capsule including instruction payload information and multiple driver version images contained therein, the UEFI custom update capsule being formed from an original UEFI capsule by inserting instruction payload information into the original UEFI capsule, and the instruction payload information being indicative of a driver update action, a specified remote or local storage location of a given firmware update package, or both;
reading the instruction payload information contained in the custom update capsule to determine a driver update action, the determined driver update action being either one of:
unloading an existing firmware driver version from a system memory of the information handling system and loading a different upgraded or downgraded firmware driver version on to the system memory from the custom update capsule, or
leaving the existing firmware driver version resident on the system memory and not loading a different firmware driver version on system memory from the custom update capsule; and
performing the determined driver update action;
where the custom update capsule contains none of the firmware images contained in the firmware update package; and
where the custom update capsule has a format of a conventional UEFI capsule with the instruction payload information substituted in place of firmware payload components that include the firmware images of the firmware update package that are stored separately from the custom update capsule.

10. The method of claim 9, further comprising using at least one processing device of the information handling system to query the system memory to determine the identity of the firmware driver version currently resident on the system memory; and then determining the driver update action based at least in part on the determined identity of the firmware driver version currently resident on the system memory.

11. The method of claim 10, where the instruction payload information comprises a metadata operator; and where the method further comprises using at least one processing device of the information handling system to apply the metadata operator to the determined identity of the firmware driver version currently resident on the system memory to determine the driver update action.

12. The method of claim 9, where the determined driver update action comprises using at least one processing device of the information handling system to unload the existing firmware driver version from the system memory, and to load a different upgraded or downgraded firmware driver version on to the system memory from the custom update capsule.

13. The method of claim 9, where the determined driver update action comprises using at least one processing device of the information handling system to leave the existing firmware driver version resident on the system memory and not to load a different firmware driver version on to system memory from the custom update capsule.

14. The method of claim 9, further comprising:
using a host processing device of the information handling system to:
read instruction payload information contained in the custom update capsule to determine a specified location of a given firmware update package configured for a target device of the information handling system that is currently connected to the at least one processing device of the information handling system and that is remotely or locally stored, the given firmware update package being separate from the custom update capsule and including one or more firmware images, and
retrieve the given firmware update package from the specified location determined from the specified firmware update package; and
using a processing device of the information handling system to execute the current firmware driver of the target device to load the firmware update into non-volatile memory of the target device after the determined driver update action has been performed.

15. The method of claim 9, further comprising inserting the instruction payload information into the original UEFI capsule to form the custom UEFI update capsule before the step of retrieving the custom UEFI update capsule from the source external to the information handling system.

16. The method of claim 15, where the instruction payload information is indicative of both the driver update action and the specified remote or local storage location of the given firmware update package.

17. An information handling system, comprising at least one processing device that is coupled to memory storing executable instructions configured to perform the following steps in an out-of-band manner separate from and outside an operating system prior to operating system booting and prior to booting the information handling system:
retrieving a custom unified extensible firmware interface ("UEFI") update capsule from a source external to the information handling system, the UEFI custom update capsule being formed from an original UEFI capsule by removing one or more firmware images from the original UEFI capsule and replacing the removed firmware images with instruction payload information that describes a specified remote or local storage location of a given firmware update package that includes the removed firmware images, the specified remote or local storage location being separate from the UEFI custom update capsule;
reading the instruction payload information contained in the custom update capsule to determine the specified location of the given firmware update package that is remotely or locally stored, the given firmware update package being separate from the custom update capsule and including the one or more firmware images; and
retrieving the given firmware update package from the specified location determined from the specified firmware update package;
where the custom update capsule contains none of the firmware images contained in the firmware update package; and
where the custom update capsule has a format of a conventional UEFI capsule with the instruction payload information substituted in place of firmware payload components that include the firmware images of the firmware update package that are stored separately from the custom update capsule.

18. The system of claim 17, where the specified location is network storage coupled to the information handling system by a network; and where the at least one processing device is further configured to retrieve the given firmware update package across the network from the network storage.

19. The system of claim 17, where the given firmware update package is configured for a target device of the information handling system that is currently connected to the at least one processing device of the information handling system; where the source external to the information handling system is separate and external to a chassis of the information handling system; and where the system further comprises:
a remote access controller processing device within the information handling system and configured to retrieve the custom update capsule across an external network from the source external to the information handling system, and to store the retrieved custom update capsule in non-volatile memory coupled to the remote access controller;
a host processing device within the information handling system and coupled to the remote access controller processing device by an internal communication bus of the information handling system, the host processing device being configured to:
receive the custom update capsule from the remote access controller, and
read the instruction payload information contained in the custom update capsule to determine the specified location of a given firmware update package, and
retrieve the given firmware update package from the determined specified location; and
a processing device configured to execute the current firmware driver of the target device to load one or more of the firmware images of the firmware update package into non-volatile memory of the target device.

20. The system of claim 19, where the information handling system is a server or desktop computer.

21. An information handling system, comprising at least one processing device configured to perform the following steps in an out-of-band manner separate from and outside an operating system prior to operating system booting and prior to booting the information handling system:
retrieving a unified extensible firmware interface ("UEFI") custom update capsule from a source external to the information handling system, the custom update capsule including instruction payload information and multiple driver version images contained therein, the UEFI custom update capsule being formed from an original UEFI capsule by inserting instruction payload information into the original UEFI capsule, and the instruction payload information being indicative of a driver update action, a specified remote or local storage location of a given firmware update package, or both;
reading the instruction payload information contained in the custom update capsule to determine a driver update action, the determined driver update action being either one of:
unloading an existing firmware driver version from a system memory of the information handling system and loading a different upgraded or downgraded firmware driver version on to the system memory from the custom update capsule, or leaving the existing firmware driver version resident on the system memory and not loading a different firmware driver version on to the system memory from the custom update capsule; and performing the determined driver update action;

where the custom update capsule contains none of the firmware images contained in the firmware update package; and where the custom update capsule has a format of a conventional UEFI capsule with the instruction payload information substituted in place of firmware payload components that include the firmware images of the firmware update package that are stored separately from the custom update capsule.

22. The system of claim 21, where the instruction payload information comprises a metadata operator; and where the at least one processing device is further configured to:

query the system memory to determine the identity of the firmware driver version currently resident on the system memory; and determine the driver update action based at least in part on the determined identity of the firmware driver version currently resident on the system memory by applying the metadata operator to the determined identity of the firmware driver version currently resident on the system memory to determine the driver update action.

23. The system of claim 21, where the determined driver update action comprises using at least one processing device of the information handling system to unload the existing firmware driver version from the system memory, and to load a different firmware driver version on to the system memory from the custom update capsule.

24. The system of claim 21, where the determined driver update action comprises using at least one processing device of the information handling system to leave the existing firmware driver version resident on the system memory and not to load a different firmware driver version on to the system memory from the custom update capsule.

25. The system of claim 21, where the system comprises:

a host processing device configured to:

read instruction payload information contained in the custom update capsule to determine a specified location of a given firmware update package that is remotely or locally stored, the given firmware update package being separate from the custom update capsule and including one or more firmware images configured for a target device of the information handling system that is currently connected to the at least one processing device of the information handling system, and retrieve the given firmware update package from the specified location determined from the specified firmware update package; and a processing device configured to execute the current firmware driver of the target device to load one or more of the firmware images of the firmware update package into non-volatile memory of the target device after the determined driver update action has been performed.

26. The system of claim 21, where the instruction payload information is indicative of both the driver update action and the specified remote or local storage location of the given firmware update package.

\* \* \* \* \*